G. B. WILLIAMSON.
PROCESS FOR CONTINUOUS DEFECATION OF SUGAR SOLUTIONS.
APPLICATION FILED APR. 30, 1918.
1,317,607.
Patented Sept. 30, 1919.
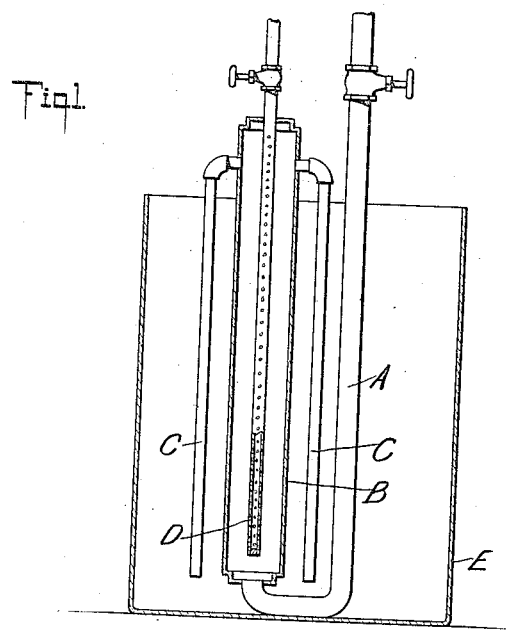
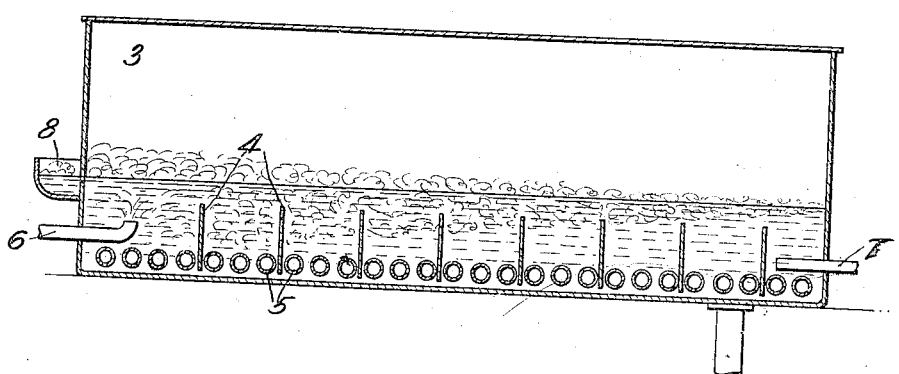
WITNESSES
INVENTOR
G. B. Williamson
BY
ATTORNEYS

UNITED STATES PATENT OFFICE.

GEORGE B. WILLIAMSON, OF GRAMERCY, LOUISIANA, ASSIGNOR, BY DIRECT AND MESNE ASSIGNMENTS, TO THE INDUSTRIAL APPARATUS CORPORATION, OF BROOKLYN, NEW YORK, A CORPORATION OF NEW YORK.

PROCESS FOR CONTINUOUS DEFECATION OF SUGAR SOLUTIONS.

1,317,607.  Specification of Letters Patent.  Patented Sept. 30, 1919.

Application filed April 30, 1913. Serial No. 231,667.

*To all whom it may concern:*

Be it known that I, GEORGE B. WILLIAMSON, a citizen of the United States, residing at Gramercy, in the parish of St. James and State of Louisiana, have invented a new and Improved Process for Continuous Defecation of Sugar Solutions, of which the following is a full, clear, and exact description.

The object of my invention is to provide a process of continuous defecation of sugar solutions and which is characterized by the treatment of sugar solutions with heat, lime, phosphoric acid or sulfurous acid gas, and air.

In the accompanying drawings, forming part of the specification, the figures show diagrammatically the apparatus in which my process may be carried on, and in which—

Figure 1 is a diagrammatic elevation of a defecating apparatus for treating the sugar solutions with air after they have been treated with defecating substances; and Fig. 2 is a diagrammatic elevation of a defecating tank in which the defecated and aerated sugar solution is heated to obtain the desired separation of the impurities from the solution.

Heat and lime coagulate the albumen and organic acids, which results in a flocculent precipitate in the sugar solution so treated. The phosphoric acid and sulfurous acid gas both act on lime, forming a tribasic calcium phosphate which produces a large precipitate. The addition of the acids to the sugar solution also bleaches the solution.

The amount of ingredients necessary for the defecation of the sugar solution depends on the variety of the sugar cane, the manner of extraction, and the grade of sugar manufactured; and in the case of sugar refining, the grade of sugar that is melted.

The amount of alkalinity or acidity is an important part and should be accurately determined, as any excess of lime at a high temperature acts on the reducing sugars, forming dark-colored lime salts which cause inversion and retard evaporation and crystallization. Excess of acid at high temperature will cause inversion, producing glucose which does not crystalize and would be loss in manufacture.

If raw sugar of about 96° test from sugar cane is to be purified, the juice as extracted from the cane is treated while cold in a mixing tank with a sufficient quantity of lime and then impregnated with air by forcing air through the solution. For this purpose, a device such as shown in Fig. 1 of the accompanying drawings may be used.

The juice is delivered through a conduit A to the bottom of a chamber B, the chamber having an overflow C at the top. An air conduit D is provided in the chamber B. The chamber B is preferably long and narrow so that the conduit D extending substantially through the entire length of the chamber could easily supply the liquid in the chamber B with air all along the chamber. For that purpose the conduit D within the chamber is perforated. The overflow conduits C preferably enter a receiving tank E in which the air chamber B may be located, as shown in Fig. 1.

The raw sugar can also be treated with sulfurous acid and sufficient lime added to neutralize it and then impregnated with air. This treatment is particularly suitable when plantation white and high-grade yellow sugars from sugar cane are to be defecated.

The following steps may also be adopted: Raw sugar of about 96° test is mixed with a heavy syrup to form a mash, and purged and washed in centrifugals to separate the crystals and molasses. The resulting sugar is melted with about one-half its weight of water at a temperature not exceeding 140° F. The sugar liquor is first treated in a mixing tank with phosphoric acid neutralized with lime and then thoroughly impregnated with air in the manner as previously stated. The raw sugar washings may be treated in the same manner.

After preparing the solutions in the manner as stated the same are fed to a tank 3. (See Fig. 2). The tank has a series of partitions or baffles 4 dividing the tank into compartments, each compartment being provided with steam pipes 5 located near the bottom of the compartment. The partitions 4 are spaced from the bottom of the tank so as to establish communication at the bottom between the compartments. Steam is fed to the pipes from both sides of the tank so that the alternate pipes receive the steam from opposite sides of the tank; thereby a more uniform temperature is maintained within the defecating tank. The solution is maintained within the tank at a level slightly above the partitions 4. The steam in the pipe raises the temperature of the solution within the tank to about 210° F. The heat facilitates the reaction between the defecants and the solutions causing the precipitation of albuminoids and organic acids.

The precipitant carries away with it suspended impurities which with the air are carried to the surface and form a layer of scum at the top, leaving a clear solution at the bottom. In this operation a clear solution may be obtained rapidly by using from 40 to 50 pounds steam, which will give a thorough separation in about ten minutes. Having obtained the clear solution the steam is lowered to ten pounds pressure; and the inlet 6 and outlet 7 from the tank 3 may be opened to cause a continuous flow of the solution, which may be regulated to maintain the same temperature in the tank.

The baffle plates serve as a guide for the impurities, to direct them toward the top where they are entangled with the albuminoids and discharged through a special overflow 8 provided in the tank.

In cases where sugar that has deteriorated is being worked, the washing cannot be run continuously, owing to fermentation which is active upon heating and breaks up the precipitate and allows the air to escape before settling. In such cases the solution is treated in the manner described and heated by running continuously through the defecator and allowed to settle in the tanks, which takes about thirty minutes. This method of defecation is more economical and gives perfect results. It can be easily controlled and gives a greater yield of sugar. The cost of the defecants is very low, for a great amount of air is used with great advantage, as has been clearly shown.

I claim:

1. A process for defecating sugar solutions, which consists in treating the solutions with defecants, then aerating the solutions by bubbling air through them, and then heating the solutions to cause the impurities to rise to the surface.

2. A process for defecating sugar solutions, which consists in treating a solution with lime, aerating the solution by bubbling air through it, and then heating the solution to cause the impurities to rise to the surface.

3. A process for defecating sugar solutions, which consists in treating a solution with phosphoric acid, neutralizing the solution with lime, aerating the so-treated solution by bubbling air through it, then heating the solution, the air in the heated solution being caused to rise and entrain therewith the impurities and the compounds formed by the defecants used.

4. A process for defecating sugar solutions, which consists in treating a solution with an acid, neutralizing the so-treated solution with lime, draining it off, aerating the so-drained solution, heating the aerated solution to cause the impurities to rise to the surface, and draining off the clear liquid from the bottom.

GEORGE B. WILLIAMSON.